Oct. 21, 1924.

A. H. CARLSON

ELECTRIC WATER HEATING SYSTEM

Filed Jan. 7, 1922

1,512,405

INVENTOR
Androv H. Carlson
BY
G. H. Braddock
ATTORNEY

Patented Oct. 21, 1924.

1,512,405

UNITED STATES PATENT OFFICE.

ANDROV H. CARLSON, OF BRIDGEPORT, CONNECTICUT, ASSIGNOR TO INSTANT ELECTRIC WATER HEATER COMPANY, OF BRIDGEPORT, CONNECTICUT, A CORPORATION OF CONNECTICUT.

ELECTRIC WATER-HEATING SYSTEM.

Application filed January 7, 1922. Serial No. 527,533.

*To all whom it may concern:*

Be it known that ANDROV H. CARLSON, a subject of the King of Sweden, and resident of Bridgeport, in the county of Fairfield and State of Connecticut, has invented certain new and useful Improvements in Electric Water-Heating Systems, of which the following is a specification.

This invention relates to an electric water heating system, and an important object of the invention is to provide an instantaneous water heater which will be an improvement generally upon all devices of similar character heretofore known.

A further important object is to provide an electric water heating system including a hydraulically manipulated valve adapted to actuate an ordinary circuit controller to automatically make a circuit through resistance members of a heating element when a faucet is open and to automatically break the circuit when the faucet is shut off.

A still further important object is to provide a water heating system capable of heating water to a predetermined temperature and to equip the system with adjustable means for accurately regulating the temperature at which the water will be delivered to a faucet.

A still further important object is to provide a system of the present character including a source of electric current, a heating element having passages with resistance members, and a hydraulically manipulated circuit controller for making and breaking the circuit through the resistance members of the heating element.

A still further important object is to provide a water heating system including a source of electric current, a heating element having passages with resistance members, an ordinary circuit controller adapted to be automatically actuated to make a circuit through the resistance members when water is flowing through the element and to break the circuit when the flow of water is stopped, and a thermostatically operated circuit controller adapted to the purpose of regulating the temperature at which water shall flow from the heating element.

A still further important object is to provide a system of the present character which will include a source of electric current, a heating element of ordinary or preferred construction having passages with resistance members, a magnetic switch, of any suitable type, two automatically operated circuit controllers, one of said controllers being of ordinary construction but desirably manipulated by a hydraulically actuated valve and the other of said controllers being an auxiliary controller which is thermostatically manipulated and suitable electric connections between the source of electric current, the magnetic switch, the controllers, and the resistance members of the heating element.

With the above and other objects in view, the construction, arrangement and combination of parts constituting the invention will now be fully described and will hereinafter be specifically claimed, it being understood that changes in details of construction and arrangement of parts may be made so long as within the spirit of the invention and the scope of the appended claims.

In the accompanying drawing forming a part of the specification:

Figure 1:
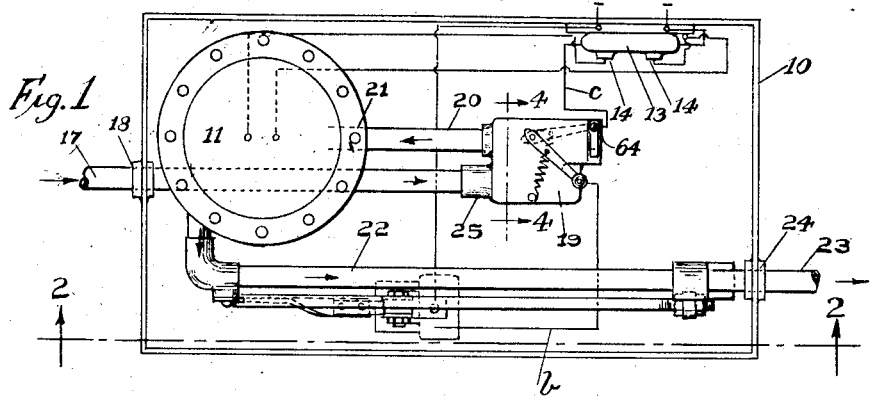
Fig. 1 is a top plan view disclosing so much of the system as is necessary to illustrate the invention.

In the drawing, 10 denotes a housing which may contain the several elements of the system, 11 a heating element of ordinary or preferred construction, 12 a base for the heating element, 13 a magnetic switch of suitable type for the purpose, 14 the movable blades of said switch, and 15 and 16 denote generally the ordinary and the auxiliary circuit controllers, respectively.

Numeral 17 denotes an inlet pipe entering the housing at 18 and leading into the valve casing 19. 20 denotes a pipe extending from the valve casing and entering the heating element at 21, and 22 denotes a pipe leading from the heating element and extending out of the housing as at 23 to a faucet (not shown) and rigidly secured in the housing as at 24.

Of the ordinary circuit controller, 25 denotes a coupling member secured to the inlet pipe as at 26 and having a sleeve 27 arranged within the valve casing and provided with ports, 28, and 29 denotes a tubular slide valve arranged in the sleeve. 30 represents a spindle mounted to rotate in the valve casing and rigidly carrying a lever 31 having connection with the tubular slide valve in any preferred manner as denoted at 32. 33 denotes a lever fixed to the portion of the spindle extending outside of the valve casing as at 34 and carrying a movable contact member 35, 36 denoting a stationary contact member, desirably of the construction shown, preferably arranged upon the valve casing and insulated therefrom as denoted generally at 37. 38 denotes a post supported upon the valve casing as at 39, and 40 represents a coil spring having one of its ends attached to the post as at 41 and its other end attached to the lever 33 as at 42 and adapted to normally hold the movable contact member 35 away from the stationary contact member 36.

Of the auxiliary, thermostatically operated circuit controller, 43 represents a standard desirably supported upon the housing as at 44 and freely receiving the outlet pipe 22 as at 45. 46 represents an L-shaped lever pivoted upon the pipe 22 as at 47, 48 represents a tie rod pivoted upon the L-shaped lever as at 49 and adjustably fixed in the standard 43 by means of the nuts 50, and 51 denotes a spring arm desirably of Z-shape secured upon the free end of the L-shaped lever as at 52. Numeral 53 represents an insulating support for the stationary member 54 of the auxiliary circuit controller, 55 denotes an upright adjacent to the insulating support, and 56 denotes an arm pivoted upon the upright as at 57 and carrying the movable contact member 59 of the auxiliary circuit controller, the arm having an extension 58 suitably shaped to cooperate with the free end of the flat spring 51 in a manner to be described to allow the movable contact member 59 to be in engagement with the stationary contact member 54 or to be removed therefrom, depending upon the position of the free end of said flat spring 51. A set screw 60 adjustably situated adjacent the extension 58 of the arm 56 is for the obvious purpose of limiting the movement of the movable contact member 59 away from the stationary contact member 54.

Reference character $a$ represents a lead wire extending from the source of electric current and secured upon the binding post 61 of the movable contact member 59 of the auxiliary circuit controller, $b$ denotes a lead wire attached by means of binding post 62 to the stationary member of the auxiliary circuit controllers and extending to the movable contact member 35 of the ordinary circuit controller and connected by means of binding post 63, $c$ denotes a lead wire attached by means of the binding post 64 to the stationary contact member of the ordinary circuit controller and extending to the magnetic switch, the attachment between the lead wire $c$ and the magnetic switch being denoted generally at 65 and $d$ denotes a lead wire attached to the magnetic switch as denoted generally at 66 and connected with the source of electric current. $e$ denotes a lead wire having connection with one of the blades of the magnetic switch as at 67 and entering the heating element as at 68, there being a continuous passage with resistance members through the heating element, and $f$ denotes a lead wire passing out of the heating element as at 69 and connected with the other blade of the magnetic switch as at 70.

Figure 2:
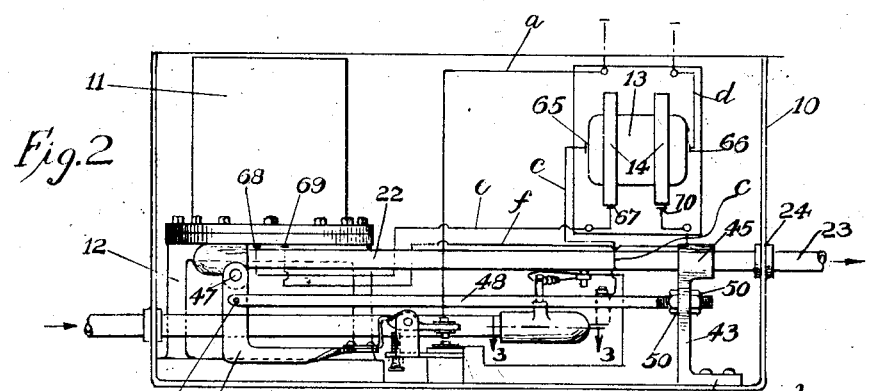
Fig. 2 is a sectional view on line 2—2 in Fig. 1 looking in the direction of the arrows.
Figures 3, 4:
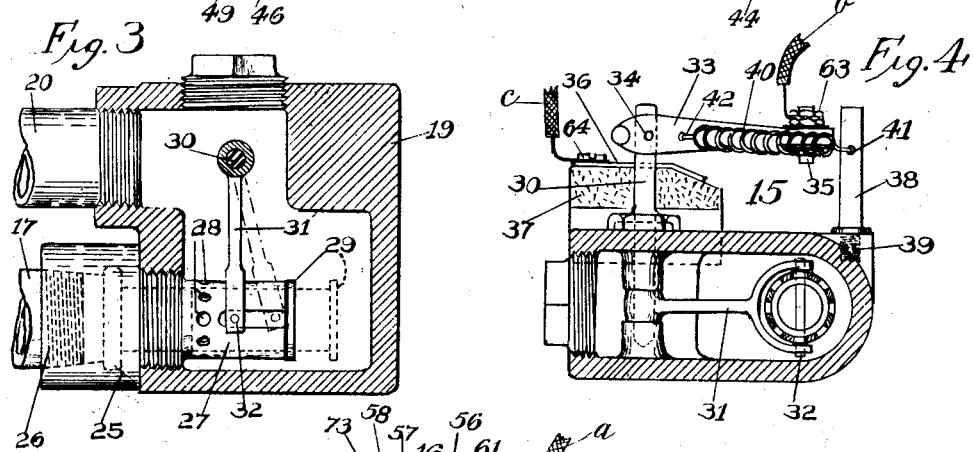
Fig. 3 is an enlarged sectional view on line 3—3 in Fig. 2 looking in the direction of the arrows.
Fig. 4 is an enlarged sectional view on line 4—4 in Fig. 1 looking in the direction of the arrows.

The method in which the system operates to perform its function will now be described. The water to be heated enters the housing through the inlet pipe 17, flows through the valve casing, thence through the heating element, and out through the outlet pipe 22, as illustrated by the arrows in Figs. 1 and 2. Obviously when the faucet is shut off and no water is flowing out of the outlet pipe the coil spring 40 will act to hold the movable contact member of the ordinary circuit controller away from the stationary member thereof, and will cause the tubular slide valve to be in its full line position of Fig. 3. When the faucet is turned to open position and the water commences to flow through the outlet pipe, the water will move the tubular slide valve to or toward the dotted line position in Fig. 3, against the action of the coil spring 40, to uncover the ports 28 and the movable contact member of the ordinary circuit breaker will thus be moved into engagement with the stationary contact member thereof. Provided now that the movable and stationary contact members of the auxiliary circuit controller are in engagement, a circuit will flow from the source of electric current, through the contacts of the auxiliary circuit controller, through the contacts of the ordinary circuit controller, through the magnetic switch and back to the source of electric current. This will, evidently, magnetize the magnetic switch and cause the blades thereof to move to closed position, thus establishing a circuit from the source of electric current through the resistance members of the electric heater by means of the lead wires $e$ and $f$, as will be understood. When the movable member of the auxiliary circuit controller is in its normal position it is in engagement with the stationary member thereof, so that when a faucet is open to allow water to flow from the outlet pipe 22 the necessary connections are made to heat the resistance members. However, as soon as the faucet is shut off and the flow through the outlet pipe is stopped, coil spring 40 acts to break the circuit through the magnetic switch. As a result, this switch is demagnetized and the blades thereof move to open position, breaking the circuit through the resistance members of the heating element.

Figure 5:
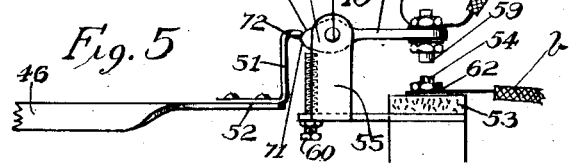
Fig. 5 is an enlarged elevational view of the thermostatically operated circuit controller.

It is axiomatic that the length of the outlet pipe is dependent upon its temperature, and this pipe is, naturally, sensitive to changes in the temperature of the water in the pipe. The tie rod 48, being spaced from the heating water, will remain at fixed length, while the end of the outlet pipe pivotally supporting the L-shaped lever 46 will move toward left or right in Figs. 1 and 2, depending upon whether the temperature of the pipe is raised or lowered, this for the reason that the end 23 of the pipe is secured in the housing at 24. The result will be that the L-shaped lever will be swung on its pivot 49 to raise the flat spring 51 when the pipe expands and to lower said spring when the pipe contracts. The construction and arrangement of the free end of the flat spring and the extension 58 of the movable contact member of the auxiliary circuit controller is such that when the outlet pipe 22 is at or beneath a predetermined temperature the said free end of the flat spring is lowered to an extent to engage the curved underface 71 of said extension 58. As the water heats the outlet pipe 22 past the temperature previously fixed, the free end of the flat spring slides upwardly over the point 72 of the extension 58 and quickly slides up the curved upperface 73, in the manner suggested in Fig. 5, to push said extension downwardly and remove the movable contact member 59 from the fixed contact member 54 with a snap. Obviously, as soon as the pipe cools to the temperature previously fixed the free end of the flat spring passes back over the point 72 and similarly slides over the curved face 71 to cause the movable and stationary contact members to become engaged with each other with a snap. It is apparent that tie rod 48 between the standard 43 and the pivotal point 49 on the L-shaped lever 46 can be adjusted by means of the nuts 50 to set the auxiliary circuit controller to break the circuit when the outlet pipe 22 is at any preferred temperature.

Having thus fully described my invention what I claim as new and desire by Letters Patent is:

1. In a system of the character described, a source of electric current, a water heating element having passages with resistance members, and an hydraulically operated circuit controller for making and breaking a circuit through said resistance members, said circuit controller including a tubular slide valve, a sleeve with ports, and an electric switch, water flowing through the system adapted to move the slide valve and uncover the ports and hold the switch in closed circuit position, and a spring adapted to move the switch to open circuit position when the flow of water through the system is stopped.

2. In a system of the character described, a source of electric current, a water heating element having passages with resistance members, and a thermostatically operated circuit controller for determining the temperature at which water shall flow from the heating element, said controller including a tie rod adjustable as to length, a lever pivoted upon said tie rod, and an electric switch associated with said lever, an end of said lever being pivoted upon an outlet pipe of said system, and said switch adapted to be actuated by reason of the expansions and contractions of said outlet pipe.

Signed at Bridgeport, in the county of Fairfield and State of Connecticut, this 3rd day of January, A. D., 1922.

ANDROV H. CARLSON.